(12) United States Patent
Gaiser

(10) Patent No.: US 11,781,459 B2
(45) Date of Patent: Oct. 10, 2023

(54) HEATING UNIT FOR AN EXHAUST-GAS SYSTEM OF AN INTERNAL COMBUSTION ENGINE

(71) Applicant: Purem GmbH, Neunkirchen (DE)

(72) Inventor: Gerd Gaiser, Reutlingen (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 18/050,830

(22) Filed: Oct. 28, 2022

(65) Prior Publication Data

US 2023/0136357 A1    May 4, 2023

(30) Foreign Application Priority Data

Oct. 29, 2021 (DE) ...................... 10 2021 128 240.3

(51) Int. Cl.
| | |
|---|---|
| *F01N 3/26* | (2006.01) |
| *F01N 3/027* | (2006.01) |
| *F01N 3/20* | (2006.01) |
| *F01N 3/28* | (2006.01) |

(52) U.S. Cl.
CPC .............. *F01N 3/26* (2013.01); *F01N 3/027* (2013.01); *F01N 3/2013* (2013.01); *F01N 3/2889* (2013.01); *F01N 3/2026* (2013.01); *F01N 2240/16* (2013.01); *F01N 2260/04* (2013.01)

(58) Field of Classification Search
CPC .......... F01N 3/26; F01N 3/027; F01N 3/2013; F01N 3/2889; F01N 3/2026; F01N 2240/16; F01N 2260/04
USPC .................................................. 60/303, 320
See application file for complete search history.

(56) References Cited

U.S. PATENT DOCUMENTS

| | | | | |
|---|---|---|---|---|
| 3,237,142 A | * | 2/1966 | Nuss ........................ | H05B 3/16 338/58 |
| 5,431,886 A | | 7/1995 | Rolf | |
| 2017/0273146 A1 | * | 9/2017 | Everly ..................... | H05B 3/16 |
| 2020/0300141 A1 | | 9/2020 | Gaiser | |
| 2021/0003056 A1 | | 1/2021 | Huang et al. | |
| 2022/0178290 A1 | | 6/2022 | Gaiser | |

FOREIGN PATENT DOCUMENTS

| | | |
|---|---|---|
| DE | 10 2019 107 384 A1 | 9/2020 |
| DE | 202020104976 U1 * | 11/2020 |
| DE | 20 2021 100 999 U1 | 3/2021 |
| DE | 10 2020 132 800 A1 | 6/2022 |

OTHER PUBLICATIONS

DE-202020104976-U1. Date Nov. 2020.*

* cited by examiner

*Primary Examiner* — Mickey H France
(74) *Attorney, Agent, or Firm* — Walter Ottesen, P.A.

(57) ABSTRACT

A heating unit for an exhaust-gas system of an internal combustion engine includes a heating-unit housing for conducting an exhaust-gas in a main flow direction. A plurality of heating elements are arranged in the heating-unit housing and are shaped in a meandering manner. Each heating element has a plurality of plate-like heating sections which follow one another in a heating-element longitudinal direction. The heating sections of each heating element are connected to one another via respective connecting sections. Each heating element has two connection regions which are arranged at a distance from one another. In each connection region, the heating elements are electrically conductively connected to a connection region of a further heating element.

22 Claims, 5 Drawing Sheets a)                      b)

HEATING UNIT FOR AN EXHAUST-GAS SYSTEM OF AN INTERNAL COMBUSTION ENGINE

CROSS REFERENCE TO RELATED APPLICATION

This application claims priority of German patent application no. 10 2021 128 240.3, filed Oct. 29, 2021, the entire content of which is incorporated herein by reference.

TECHNICAL FIELD

The present disclosure relates to a heating unit for an exhaust-gas system of an internal combustion engine, including a heating-unit housing, through which exhaust gas can flow in an exhaust-gas main flow direction, and a plurality of heating elements, which are arranged in the heating-unit housing and are shaped in a meandering manner, wherein each heating element has a plurality of substantially plate-like heating sections which follow one another in a heating-element longitudinal direction, wherein heating sections, arranged so as to follow one another in the heating-element longitudinal direction, of each heating element are in each case connected to one another by a connecting section, wherein each heating element has two connection regions which are arranged at a distance from one another in the heating-element longitudinal direction, wherein, in each connection region, the heating elements are or can be electrically conductively connected to a connection region of a further heating element and/or to a voltage source, wherein, for each heating element, a heating-conductor length between its connection regions is greater than an extent length of the heating element between its connection regions in the heating-element longitudinal direction.

BACKGROUND

Such a heating element is known from United States patent application no. US 2022/0178290.

SUMMARY

An object of the present disclosure is to further develop such a heating unit in such a way that the heating unit ensures more efficient, more uniform heating of the gas stream conducted therethrough.

According to the disclosure, the object can be achieved by a heating unit for an exhaust-gas system of an internal combustion engine that includes a heating-unit housing, through which gas, in particular the exhaust gas expelled from an internal combustion engine, can flow in an exhaust-gas main flow direction, and a plurality of heating elements, which are arranged in the heating-unit housing and are shaped in a meandering manner, wherein each heating element has a plurality of substantially plate-like heating sections which follow one another in a heating-element longitudinal direction, wherein heating sections, arranged so as to follow one another in the heating-element longitudinal direction, of each heating element are in each case connected to one another by a connecting section, wherein each heating element has two connection regions which are arranged at a distance from one another in the heating-element longitudinal direction, wherein, in each connection region, the heating elements are or can be electrically conductively connected to a connection region of a further heating element and/or to a voltage source, wherein, for each heating element, a heating-conductor length between its connection regions is greater than an extent length of the heating element between its connection regions in the heating-element longitudinal direction.

The heating unit according to the disclosure is distinguished in that at least two, preferably all the heating elements have substantially the same heating-conductor length.

Through the provision of the heating elements with a meandering or corrugated structure, due to the fact that the extent length in the heating-element longitudinal direction of the heating elements arranged with this meandering structure is generally significantly smaller than the heating-conductor length, that is, length of the heating element not arranged with a meandering structure but extended in a straight line between its connection regions, provision is made such that a large surface area for transfer of heat to gas flowing around a respective heating element can be realized in a relatively small volume, so that, by way of the gas, in particular the exhaust gas expelled from an internal combustion engine, that absorbs the heat, a large amount of heat can be transferred to system regions of an exhaust-gas system, including catalytic converters, that are positioned downstream of the heating elements, and the system regions can thereby be quickly brought to the light-off temperature needed for the catalytic reaction to be carried out. Since, with the heating unit constructed according to the disclosure, provision is made such that the or at least some of the individual heating elements have substantially equal heating-conductor lengths, provision is made, owing to the thus also substantially uniformly configured electrical resistance of the different heating elements, such that, over each of the heating elements, when heated through application of an electrical voltage, a substantially equal amount of heat can be released into the exhaust gas flowing around them and consequently the exhaust-gas stream flowing through the heating unit, distributed over its cross section, is heated substantially uniformly.

In the heating unit according to the disclosure, each heating element may be constructed with bent flat strip material and have broad sides which are arranged substantially parallel to the exhaust-gas main flow direction and have face sides which are arranged substantially orthogonally to the exhaust-gas main flow direction. If, in this case, at least two, preferably all the heating elements have substantially the same, preferably substantially constant, heating-conductor width between their respective face sides and/or have substantially the same, preferably substantially constant, thickness between their respective broad sides, the provision of substantially equal electrical resistances in the different heating elements and thus heating of the gas stream that is as uniform as possible is promoted.

In order to achieve a matching of the configuration of the heating elements to the cross-sectional geometry of the heating-unit housing, it is proposed that, for at least one heating element, a transverse dimension transverse to the exhaust-gas main flow direction and transverse to the heating-element longitudinal direction is substantially constant in the direction of the heating-element longitudinal direction, and/or that, for at least one heating element, the transverse dimension varies in the direction of the heating-element longitudinal direction.

In order, with such a different configuration of the heating elements, to also promote the provision of substantially equal electrical resistances thereby, for the at least one heating element with substantially constant transverse dimension, the transverse dimension may be smaller than a maximum transverse dimension of the at least one heating element with transverse dimension varying in the heating-element longitudinal direction.

For electrical contacting of the heating elements, these may be electrically conductively connected in their connection regions to contact elements, wherein at least two heating elements are electrically conductively connected in one of their connection regions to one of the contact elements and are electrically conductively connected in their other connection region to another one of the contact elements.

To obtain a combination of heating elements electrically connected in parallel with one another and electrically connected in series with one another, it is proposed that, in a first group having at least two of the heating elements, the heating elements are electrically conductively connected in one connection region thereof to a first one of the contact elements and are electrically conductively connected in the other connection region thereof to a second one of the contact elements, and that, in a second group having at least two of the heating elements, the heating elements are electrically conductively connected in one connection region thereof to a third one of the contact elements and are electrically conductively connected in the other connection region thereof to the second one of the contact elements.

In order, in this case too, to ensure heating of the gas stream that is as uniform as possible, the number of heating elements of the first group may be equal to the number of heating elements of the second group.

Heating of the gas stream that is as uniform as possible by way of a heat input that is substantially constant over the cross section of the heating unit may be achieved in that, for at least two, preferably all the heating elements, heating sections which directly follow one another in the heating-element longitudinal direction are at substantially the same, preferably substantially constant, distance from one another in the heating-element longitudinal direction, and/or in that, for at least two, preferably all the heating elements, heating sections which directly follow one another in the heating-element longitudinal direction are arranged substantially parallel to one another.

In order to be able to already induce in the heating unit itself a catalytic reaction for purification of exhaust gas flowing around it, it is advantageous if, for at least one, preferably all the heating elements, an exhaust-gas contact surface is provided at least regionally with catalytically active material.

For defined positioning of the heating elements in the heating-unit housing, provision may be made of a holding unit for holding the heating elements on the heating-unit housing in an electrically insulated manner, and/or for holding heating elements which are direct neighbors transverse to the heating-element longitudinal direction in an electrically insulated manner with respect to one another.

In this case, the holding unit may include a heating-unit-housing holding region, for example composed of electrically insulating fiber material, such as for example ceramic-fiber material or the like, which surrounds all the heating elements in a substantially ring-like manner, and/or the holding unit may include, in assignment to at least one, preferably each heating element, a heating-element holding region.

In an easily and also stably realizable construction, at least some of the heating-element holding regions, preferably all the heating-element holding regions, may be formed in one piece with one another, that is, as an integral or monolithic structure.

To allow a simple connection of the heating elements to the holding unit, it is advantageous if at least one, preferably each heating-element holding region includes two parts which are arranged so as to follow one another in the exhaust-gas main flow direction and which are formed separately from one another.

Defined positioning of the heating elements in the holding unit can be promoted in that at least one, preferably each heating-element holding region has, in assignment to at least one, preferably each heating element held thereby, a form-fit holding formation for holding against movement in the heating-element longitudinal direction at least one, preferably each connecting section of the at least one heating element held thereby.

For this purpose, at least one, preferably each form-fit holding formation may include a plurality of holding projections which in each case engage between two connecting sections which are direct neighbors in the heating-element longitudinal direction, and/or at least one, preferably each form-fit holding formation may include a plurality of holding projections which in each case engage between two heating sections which are connected to one another by a connecting section.

For the purpose of avoiding electrical short-circuiting induced by the holding unit itself, it is proposed that the holding unit is, at least at its regions which are in contact with the heating elements, preferably substantially completely, constructed and/or coated with electrically insulating material.

In the heating unit constructed according to the disclosure, at least two, preferably all the heating elements may be arranged adjacently transverse to the exhaust-gas main flow direction, and/or at least two, preferably all the heating elements may be arranged substantially parallel to one another in the heating-element longitudinal direction, and/or, for at least one, preferably for each heating element, at least some, preferably all the heating sections may be arranged substantially orthogonally to the heating-element longitudinal direction.

The disclosure furthermore relates to an exhaust-gas system for an internal combustion engine, including a heating unit constructed according to the disclosure upstream of an exhaust-gas treatment unit including for example a catalytic converter and/or a particle filter.

BRIEF DESCRIPTION OF THE DRAWINGS

The invention will now be described with reference to the drawings wherein.

DESCRIPTION OF THE PREFERRED EMBODIMENTS

Before details of configurations of heating units are discussed below with reference to FIGS. 1 to 8, an explanation will be given with reference to FIG. 9 as to how such a heating unit is integrated into an exhaust-gas system of an internal combustion engine.

Figure 9:
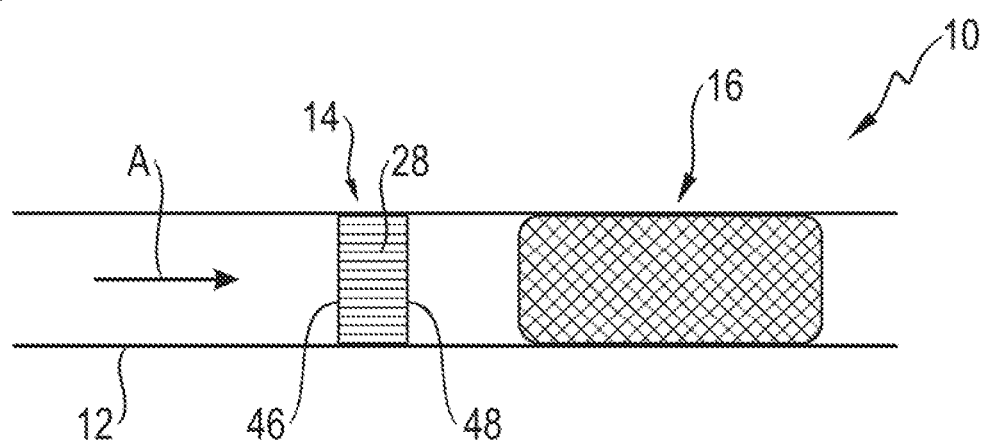

FIG. 9 shows a section of such an exhaust-gas system 10, in which a heating unit (denoted generally by 14) and, downstream in relation to an exhaust-gas main flow direction A, an exhaust-gas treatment unit 16 are arranged in a for example tubular housing 12, which housing is assembled in one piece or with multiple parts that follow one another. The exhaust-gas treatment unit 16 may include one or more catalytic converters and/or a particle filter and may act for example as an oxidation catalytic converter or the like. If the exhaust-gas treatment unit 16 includes an SCR catalytic converter, an injector for introducing a reactant, for example a urea/water solution, into the exhaust-gas stream guided in the tubular housing 12 may be provided downstream of the heating unit 14.

By way of the heating unit 14, with an electrical voltage applied thereto, it is possible, in a starting phase of the working operation of an internal combustion engine, if the exhaust gas expelled from the latter has a relatively low temperature, for heat to be transferred to this exhaust gas and transported by the exhaust gas in the direction of the exhaust-gas treatment unit 16 and transferred thereto. This makes it possible for the exhaust-gas treatment unit 16 to be quickly brought to the temperature needed for a catalytic reaction to be carried out. Even before start-up of an internal combustion engine, a gas stream, for example an air stream, can be conducted through the tubular housing 12 in order for heat to be transferred in the heating unit 14 thereto and thus also to the exhaust-gas treatment unit 16 which then follows downstream.

Figure 1:
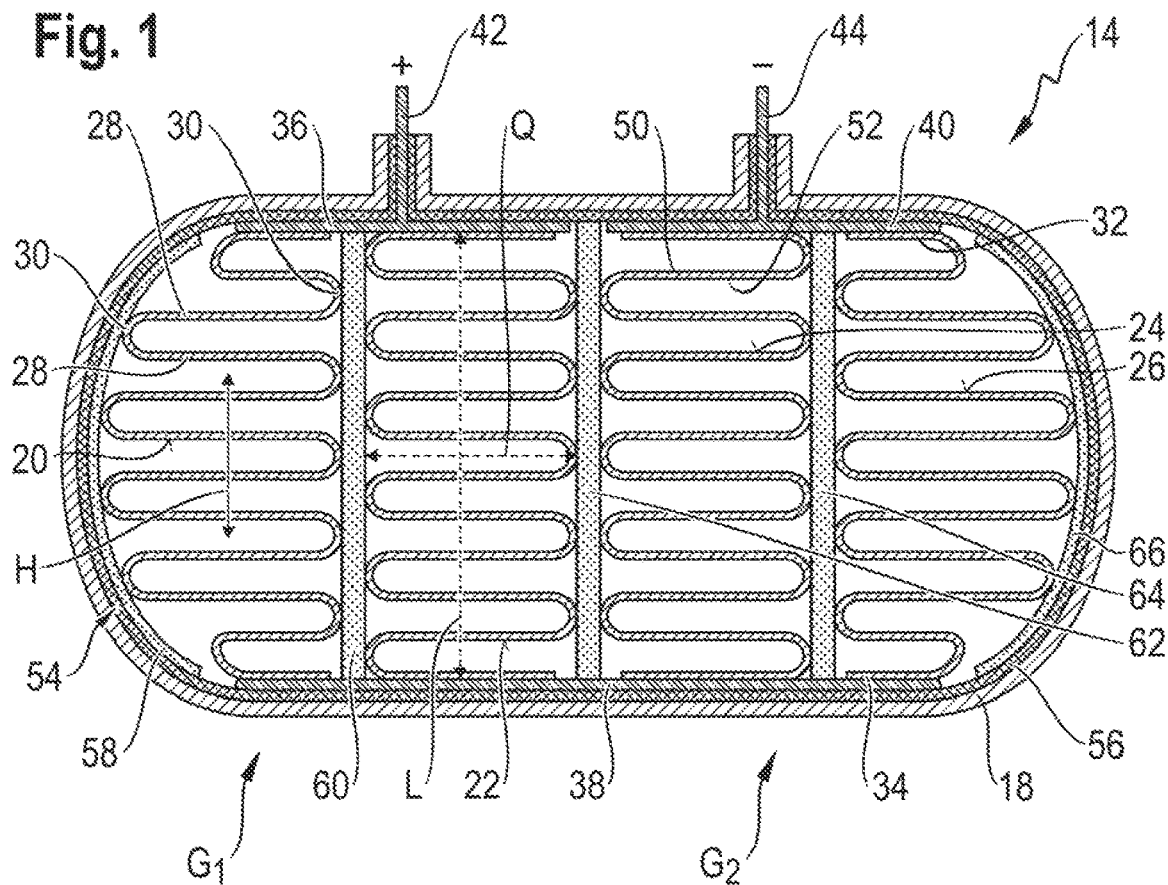
FIG. 1 shows a cross-sectional view of a heating unit for an exhaust-gas system of an internal combustion engine.

A first configurational form of such an exhaust gas heating unit 14 is illustrated in FIG. 1. The heating unit 14 includes a for example tubular heating-unit housing 18 which, for example, may be provided by the tubular housing 12 of the exhaust-gas system 10 itself or may be inserted into the latter. In the configuration illustrated in FIG. 1, four heating elements 20, 22, 24, 26 are arranged transversely to the exhaust-gas main flow direction A, which is orthogonal to the plane of the drawing in FIG. 1, in the interior of the heating-unit housing 18. The heating elements 20, 22, 24, 26 are constructed with flat strip material, bent into a meandering or corrugated structure, from metal material or some other electrically conductive material which heats up in the process and are formed, with their meandering structure, in an elongate manner in a heating-element longitudinal direction H.

As shown by the heating element 20 illustrated on the left in FIG. 1, each heating element 20, 22, 24, 26 constructed with a meandering structure is constructed with a plurality of plate-like heating sections 28, which are arranged substantially orthogonally to the heating-element longitudinal direction H, and connecting sections 30, which in each case connect two heating sections 28 which directly follow one another in the heating-element longitudinal direction H. The connecting sections 30 provide respective peak regions of the meandering or corrugated structure, and the distance transverse or orthogonal to the heating-element longitudinal direction H between two connecting sections 30 which directly follow one another in the heating-element longitudinal direction H defines a transverse dimension Q of the respective heating element 20, 22, 24, 26. It can be clearly seen in FIG. 1 that, for the two heating elements 22, 24 arranged in the central region of the heating unit 14, the transverse dimension Q is substantially constant in the heating-element longitudinal direction H, whereas, to match the curved structure of the heating-unit housing 18, the two outer heating elements 20, 26 have a transverse dimension Q which varies in the heating-element longitudinal direction H, the transverse dimension taking its maximum value in a central region, in the heating-element longitudinal direction H, of the heating elements 20, 26 and, proceeding from the central region, decreasing in both directions.

As shown by the heating element 26, each of the heating elements 20, 22, 24, 26 has at its end regions in the heating-element longitudinal direction H in each case one connection region 32, 34. Each heating element 20, 22, 24, 26 is electrically conductively connected by each of its two connection regions 32, 34 to a plate-like or rail-like contact element 36, 38 or 40. This connection may be realized for example in a cohesive manner, that is, for example, through soldering, welding or bonding, or in a form-fitting manner, that is, for example, through screwing or riveting or the like, or for example in a force-fitting manner, that is, for example, through clamping, pressing, crimping or the like.

In order for provision to be made such that, in the region of the contact elements 36, 38, 40, substantially no heat is generated by the electrical current flowing therethrough, the contact elements 36, 38, 40 may, for example, be provided with a greater thickness than the heating elements 20, 22, 24, 26 or be constructed in principle with material having relatively low electrical resistance.

In the arrangement illustrated in FIG. 1, the two adjacently arranged heating elements 20, 22 are connected to the contact element 36 at their connection regions 32 which are at the top in this illustration, and are electrically conductively connected to the contact element 38 at their connection regions 34 which are arranged at the bottom in FIG. 1. The two heating elements 20, 22 consequently form a first group $G_1$ of heating elements which are electrically connected in parallel with one another. At the same time, the two heating elements 24, 26 illustrated on the right in FIG. 1 are electrically conductively connected to the contact element 40 by their connection regions 32 which are situated at the top in this figure, and, at their connection regions 34 situated at the bottom, are likewise electrically conductively connected to the contact element 38, so that these two heating elements 24, 26 form a second group $G_2$ of heating elements which are electrically connected in parallel with one another. The two groups $G_1$ and $G_2$ of heating elements are connected in series with one another. For this purpose, the contact elements 36, 40 are or can be connected via leadthroughs 42, 44, which are electrically insulated with respect to the heating-unit housing, to the two poles of a voltage source, for example a battery in a vehicle or the like.

The two groups $G_1$, $G_2$ of heating elements, with regard to the heating elements providing these in each case, are constructed so as to be substantially identical to one another.

Each group $G_1$, $G_2$ includes a heating element 22, 24 with substantially constant transverse dimension Q, and each of these groups $G_1$, $G_2$ includes a heating element 20, 26 with varying transverse dimension Q. In addition, it is advantageously the case that the two heating elements 22, 24 with substantially constant transverse dimension Q are identical to one another, while the two heating elements 20, 26 with varying transverse dimension Q are also identical to one another.

This configuration, selected within the groups $G_1$, $G_2$, of the respective heating elements 20, 22 and 24, 26, promotes a configuration which is uniform with regard to the electrical resistance present in each group $G_1$, $G_2$.

Also contributing to this uniformity of the electrical resistance is the fact that, in the construction of a heating unit 14 illustrated in FIG. 1, all the heating elements 20, 22, 24, 26 have a substantially equal heating-conductor length, which, owing to the meandering structure of the heating elements 20, 22, 24, 26, is significantly larger than the extent length L of the respective heating elements 20, 22, 24, 26 between their connection regions 32, 34 in the heating-element longitudinal direction H. It should be pointed out that the heating-conductor length is that length of a respective heating element 20, 22, 24, 26 which this has between its respective connection regions 32, 34 if it is provided in an elongate configuration, that is, not in a meandering or corrugated structure, and for example, proceeding from the meandering structure illustrated in FIG. 1, is extended between its two connection regions 32, 34 until it has a structure substantially of a straight line.

This configuration of all the heating elements 20, 22, 24, 26 having an equal heating-conductor length also contributes to there being substantially the same electrical resistance present in each heating element 20, 22, 24, 26. In particular, also contributing to this is the fact that, in the comparison of the heating elements 22, 24 with constant transverse dimension Q, the transverse dimension Q is smaller than the maximum transverse dimension Q of the two heating elements 20, 26 with varying transverse dimension Q, but is larger than the minimum transverse dimension Q of these heating elements 20, 26 with varying transverse dimension Q.

Also contributing to the uniformity of the electrical resistance of the heating elements 20, 22, 24, 26 is the fact that the heating elements have, between respective face sides 46, 48 (see FIG. 9) as viewed in the exhaust-gas main flow direction A, which face sides are arranged substantially orthogonally to the exhaust-gas main flow direction, an equal and preferably constant width, and the fact that all the heating elements 20, 22, 24, 26 have between the two broad sides 50, 52 extending between the face sides 46, 48 thereof the same, preferably substantially constant, thickness, that is, material thickness.

With this structure of the heating elements 20, 22, 24, 26, which can be obtained for example in that substantially identical blanks of electrically conductive flat material are bent into the different meandering structures for the heating elements 22, 24, on the one hand, and the heating elements 20, 26, on the other hand, it is ensured, owing to the substantially identical electrical resistances of the heating elements 20, 22, 24, 26, that, in the region of each of these heating elements, substantially the same heating power is generated and consequently the same amount of heat can be released to the gas stream, for example exhaust-gas stream, flowing around the heating elements 20, 22, 24, 26.

What also contributes to making the release of heat into the gas stream or exhaust-gas stream more uniform is the fact that the heating sections 28 of the heating elements 20, 22, 24, 26 are in each case at the same distance from one another. In the configuration shown in FIG. 1, in which, in each of the heating elements 20, 22, 24, 26, the heating sections 28 are in each case arranged substantially orthogonally to the heating-element longitudinal direction H, it is consequently thus the case that the heating sections 28 are arranged parallel to one another and are at a distance from in each case directly neighboring heating sections 28 that is preferably the same for all the heating elements 20, 22, 24, 26. Even in the case of heating sections 28 which are arranged so as not to be parallel to one another, for example if directly neighboring heating sections 28 have a V-shaped arrangement with respect to one another, it is possible for the respective distance between respective pairs of directly neighboring heating sections 28 to be equal, but to vary transversely to the heating-element longitudinal direction H. In this way, too, a release of heat into the gas stream which is as uniform as possible over the cross section of the entire heating unit 14 is achieved, since, per unit of cross-sectional area, substantially the same heating power is generated and consequently substantially the same amount of heat for release into the gas stream, or into the exhaust-gas stream, is provided.

Figure 2:
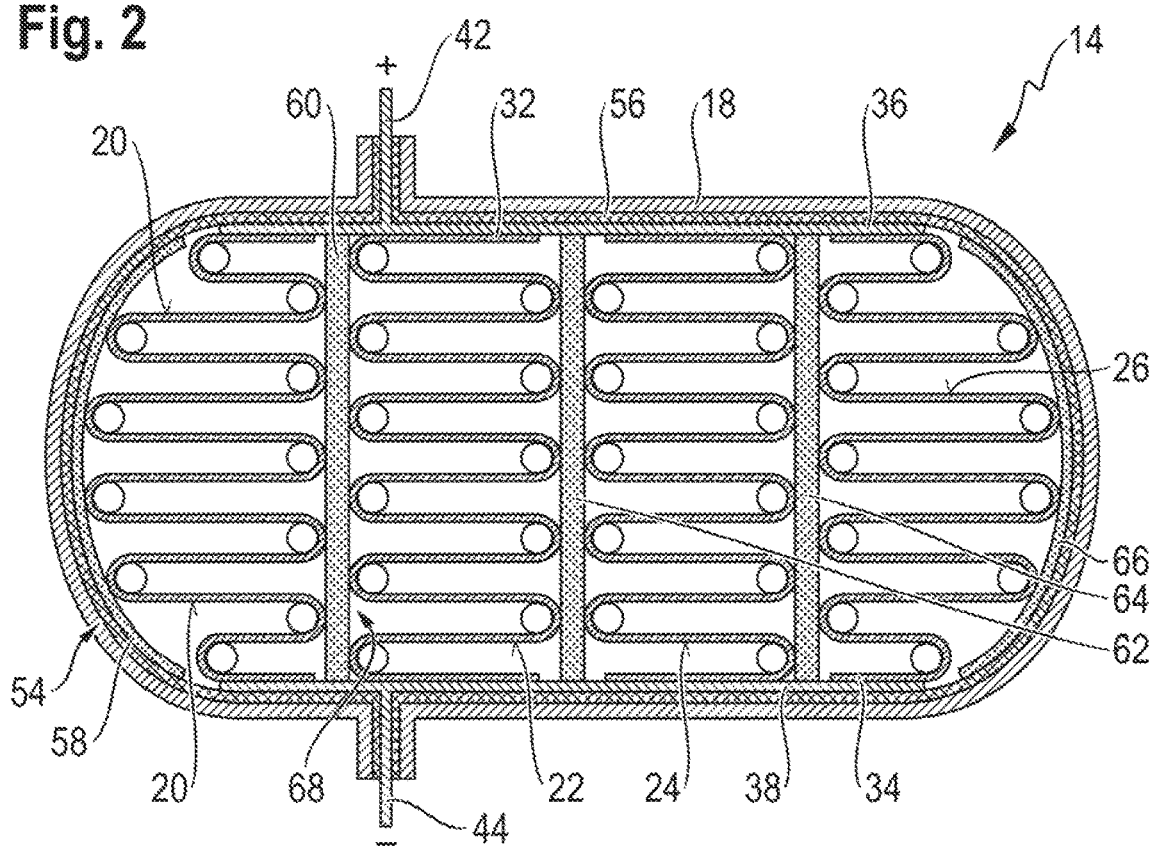
FIG. 2 shows a cross-sectional view of an alternative type of configuration of a heating unit for an exhaust-gas system.

Before explaining in more detail below how the heating elements 20, 22, 24, 26 and also the contact elements 36, 38, 40 are held in a defined manner in the heating-unit housing 18 by a holding unit (denoted generally by 54), an alternative arrangement with regard to the electrical interconnection of the heating elements 20, 22, 24, 26 will be described with reference to FIG. 2. In the heating unit 14 illustrated in FIG. 2, all four heating elements 20, 22, 24, 26 are electrically conductively connected in their respective upper connection region 32 to the contact element 36, which covers all four heating elements 20, 22, 24, 26, while the connection regions 34, situated at the bottom, of all the heating elements 20, 22, 24, 26 are connected to the contact element 38 positioned at the bottom. The contact element 36 is or can be connected to one of the poles of a voltage source via the leadthrough 42, and the contact element 38 is or can be connected to the pole of the voltage source via the leadthrough 44.

In the case of such a series connection of all the heating elements 20, 22, 24, 26, too, owing to the structure explained in detail above of the heating elements 20, 22, 24, 26, a release of heat into the gas stream flowing through the heating-unit housing 18 which is substantially uniform over the cross section of the heating-unit housing 18 is ensured.

The holding unit 54 already discussed above with reference to FIG. 1 includes, as outermost region, a heating-unit-housing holding region 56 which substantially surrounds all the heating elements 20, 22, 24, 26 and also the contact elements 36, 38, and also 40 in a ring-like manner in the case of FIG. 1. The heating-unit-housing holding region is constructed for example with electrically insulating fiber material, such as for example ceramic-fiber material or the like, or in the form of a molded part, and prevents electrical short-circuiting of various components with respect to the heating-unit housing 18, which is generally constructed with metal material.

The holding unit 54 furthermore includes five heating-element holding regions 58, 60, 62, 64, 66. Here, it is possible for example for the two heating-element holding regions 58, 66 positioned at the outside in the arch-like regions of the heating-unit housing 18 to be constructed so as to be substantially identical to one another, and also it is possible for the heating-element holding regions 60, 62, 64, 66 positioned in each case between two of the heating elements 20, 22, 24, 26 to be constructed so as to be substantially identical to one another.

The various heating-element holding regions 58, 60, 62, 64, 66, too, may, for the purpose of avoiding in particular electrical short-circuiting between heating elements 20, 22, 24, 26 directly neighboring one another, be constructed completely from electrically insulating material, such as for example plastic material or ceramic material, or may be constructed for example also from metal material which has, at least where there is a contact to in each case one of the heating elements 20, 22, 24, 26, an electrically insulating coating, for example including ceramic material or the like.

The various contact elements 36, 38, 40 are arranged between the peripheral ends, as seen in the peripheral direction, of the two heating-element holding regions 58, 66 positioned at the outside, and the ring-like structure in this case that is composed of heating-element holding regions 58, 66 and contact elements 36, 38 and possibly 40 is surrounded by the ring-like structure of the heating-unit-housing holding region 56 already described above.

As a result of the heating-element holding regions 58, 60, 62, 64, 66, not only is mutual holding or support of the heating elements 22, 24, 26 in relation to one another or in relation to the heating-unit housing 18 substantially transversely to the heating-element longitudinal direction H ensured, but also the individual heating elements 20, 22, 24, 26 are also held at their respective connecting sections 30 against movement in particular in the heating-unit longitudinal direction H. For this purpose, the heating-element holding regions 58, 60, 62, 64, 66 have, in assignment to each of the heating elements 20, 22, 24, 26 held or supported thereby, in each case one form-fit holding formation (denoted generally by 68). The form-fit holding formations 68 discussed below on the basis of various configurations provide for the creation of a form fit, effective in the heating-element longitudinal direction H, between the heating elements 20, 22, 24, 26, in the region of their respective connecting sections 30, and the heating-element holding regions 58, 60, 62, 64, 66, such that a movement of the heating elements 22, 24, 26, 28 in the region of their connecting sections 30 in the heating-element longitudinal direction H is substantially ruled out.

Figure 3:
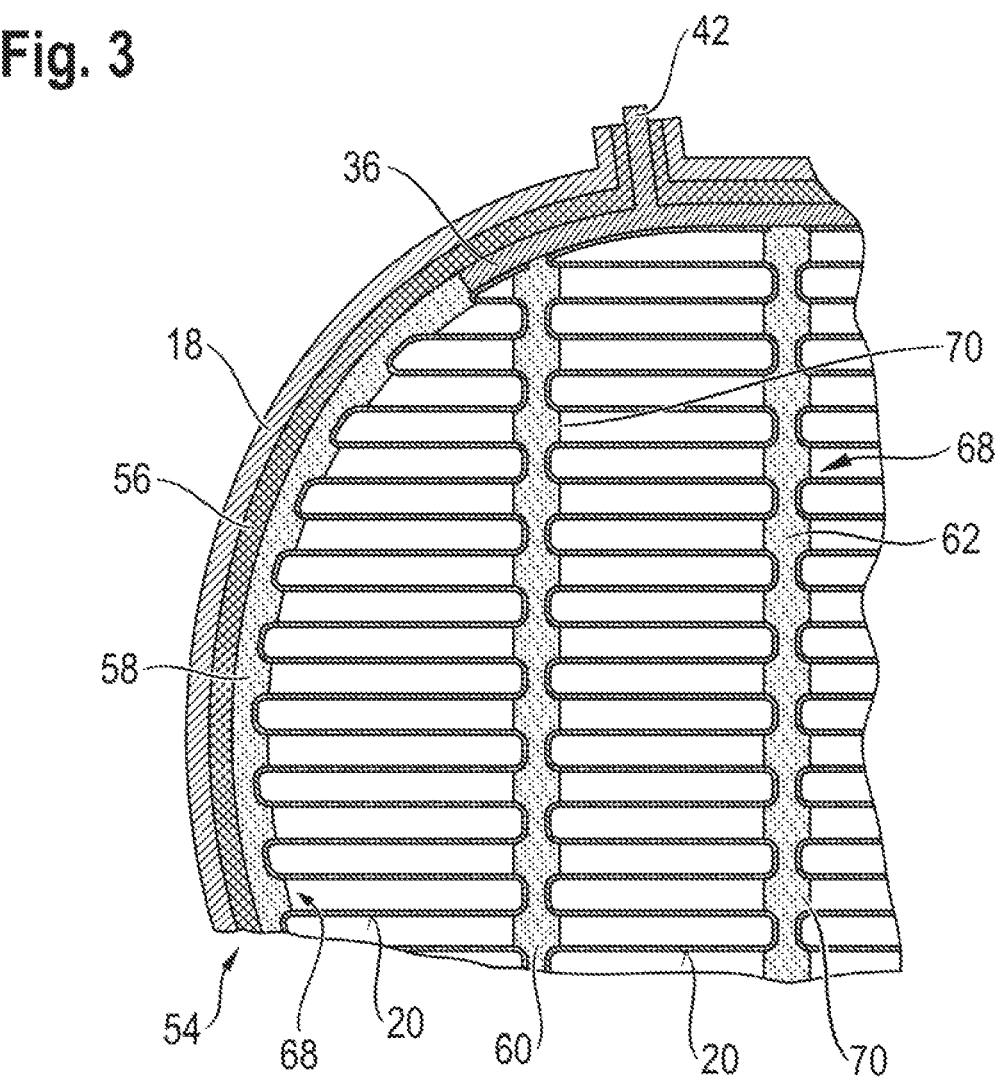
FIG. 3 shows a partial cross-sectional view of a further alternative type of configuration of a heating unit for an exhaust-gas system of an internal combustion engine.

In the configuration shown in FIG. 3, the respective form-fit holding formation 68 has a plurality of holding projections 70 which engage between two directly neighboring connecting sections 30. The mutual distance between directly neighboring holding projections 70 in the heating-element longitudinal direction H corresponds substantially also to the extent of the connecting sections in the heating-element longitudinal direction H or also to the mutual distance between the heating sections 28.

Figure 4A:
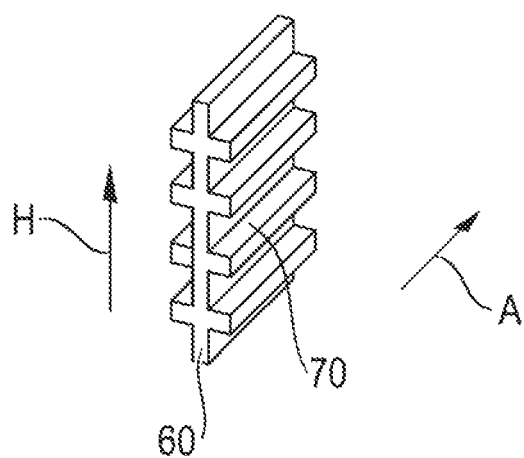
FIGS. 4A and 4B show different types of configuration of heating-element holding regions for holding in a defined position heating elements that are shaped in a meandering manner.
Figure 4B:
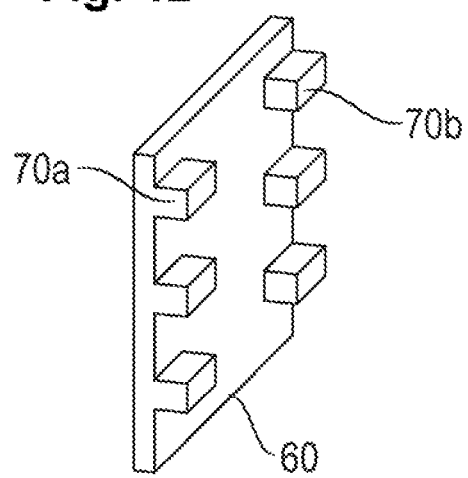

As shown in FIGS. 4A and 4B, the holding projections 70 may, in the exhaust-gas main flow direction A, that is, in the direction of extent of the connecting sections 30, held in each case thereby, between the face sides 46, 48, be formed in a continuous manner or be formed as respective holding-projection sections 70a, 70b which, for example, act in each case only in the length regions adjoining the face sides 46, 48.

Figure 5:
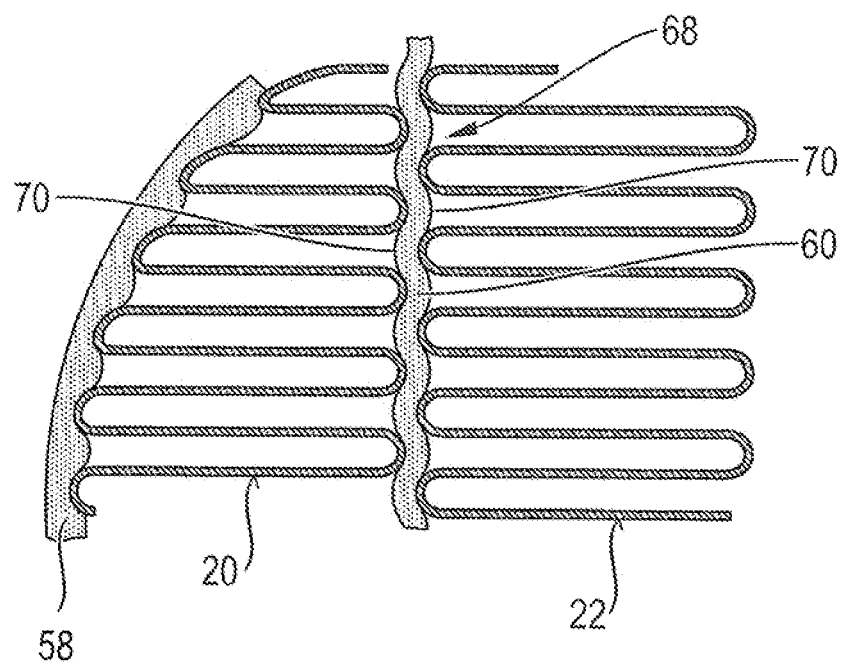
FIG. 5 shows a further partial cross-sectional view of a heating unit with alternatively shaped heating-element holding regions.
Figure 6:
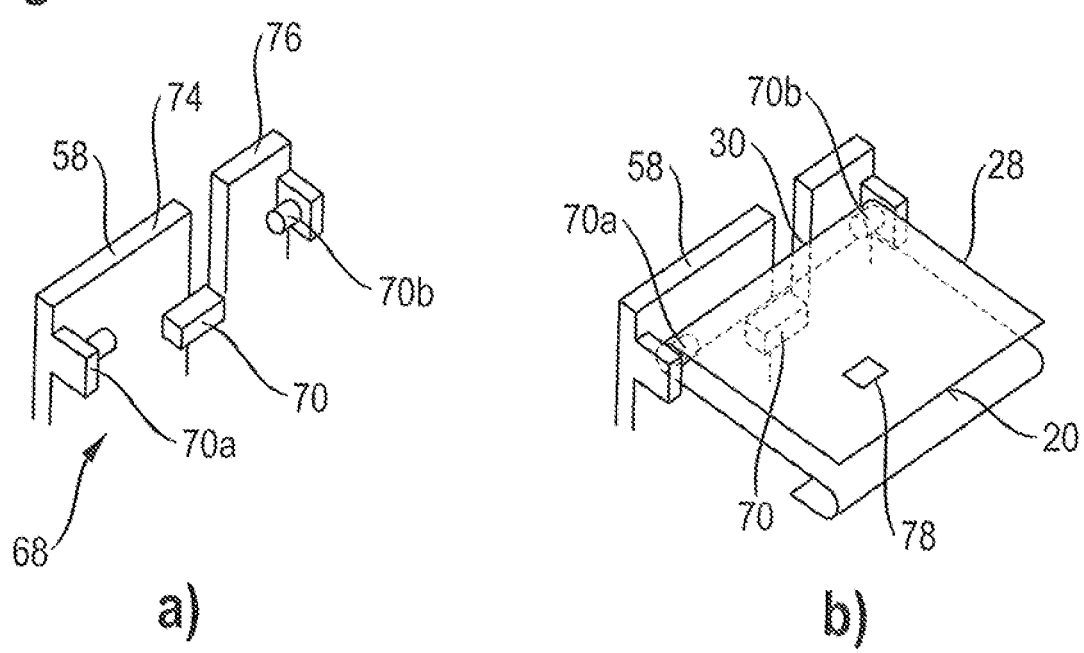
FIGS. 6A and 6B show a heating-element holding region that is used for example in the heating unit in FIG. 2.

In an embodiment, or alternative configuration, of the form-fit holding formation 68, which is illustrated in FIG. 5, it is possible, as shown in particular via the heating-element holding region 60, for the holding projections 70 to be provided with a corrugated surface structure, which can be provided in particular at the heating-element holding regions 60, 62, 64 acting between in each case two heating elements by an altogether corrugated structure thereof. In particular in the configuration illustrated in FIG. 5 of the corrugated structure of the form-fit holding formations 68, these may be formed on individual components, or layers, to be connected to one another or in an integral component which provides in each case one of the heating-element holding regions.

Comparison of FIGS. 3 and 5 shows that, in the case of the configuration of the form-fit holding formations 68 provided by a corrugated structure, the connecting sections 30 of directly neighboring heating elements 20, 22, 24, 26 are offset from one another in the heating-element longitudinal direction H, whereas in the type of configuration illustrated in FIG. 3, the holding projections 70 and consequently also the recesses formed therebetween for receiving respective connecting sections 30 are not offset from one another in the heating-element longitudinal direction H.

In the configuration shown in FIGS. 6A and 6B, the form-fit holding formation 68, shown via the heating-element holding region 58, includes for example holding projections of peg-like shape 72a, 72b that are positioned or shaped in such a way that they engage between the heating sections 28 connected to one another by a connecting section 30. In order for this engagement to be made possible, it is preferably the case that a heating-element holding section having such a form-fit holding formation 68 is constructed with two parts 74, 76 that are positioned one after the other in the exhaust-gas main flow direction A. Each of these parts 74, 76 has one of the holding projections 72a, 72b, which are assigned to one another in each case in pairs. During assembly, these two parts 74, 76 can be brought from both sides up to the face sides 46 and 48 until the holding projections 72a, 72b assume the positioning illustrated in FIG. 6B and engage into the meandering structure of the heating element 20 illustrated here.

For optional or additional holding, a plurality of holding projections 70 may be provided on one of the two parts 74, 76, wherein each such holding projection 70, as has been described above with reference to FIGS. 4A and 4B, is positioned in an engaging manner between two connecting sections 30, which are then in each case held by a pair of holding projections 72a, 72b.

Figure 7:
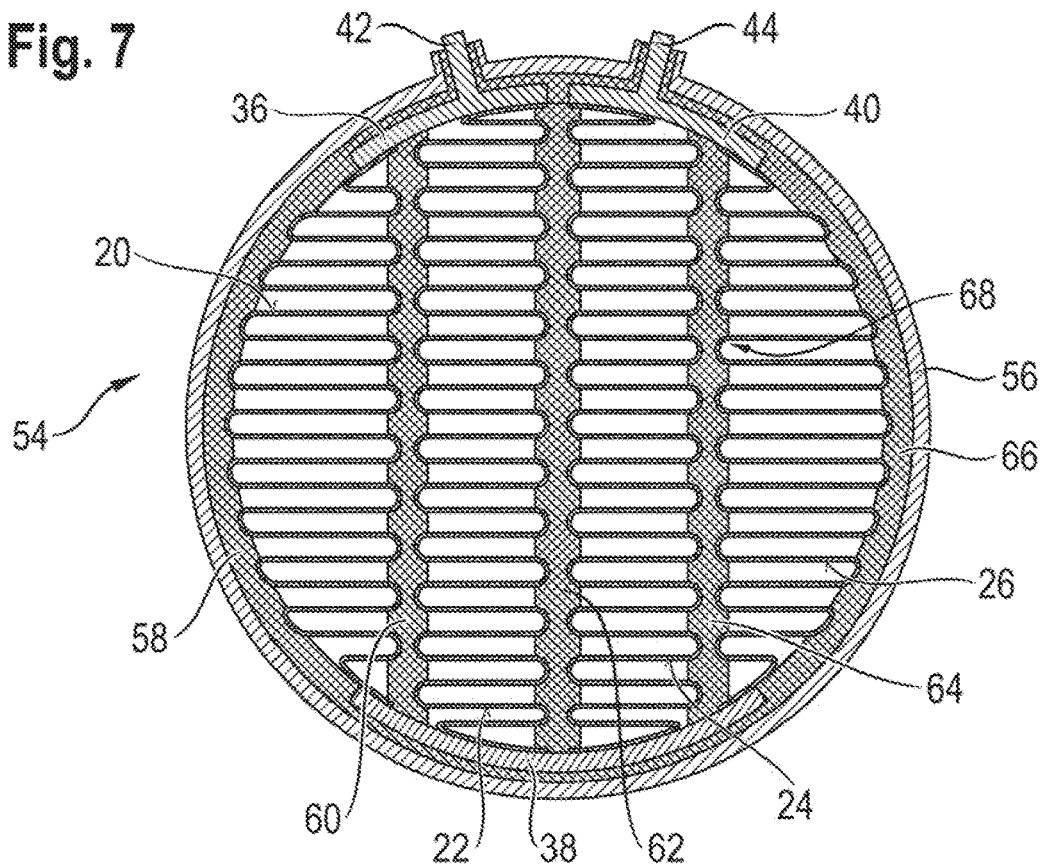
FIG. 7 shows a further cross-sectional view of a heating unit for an exhaust-gas system of an internal combustion engine.
Figure 8:
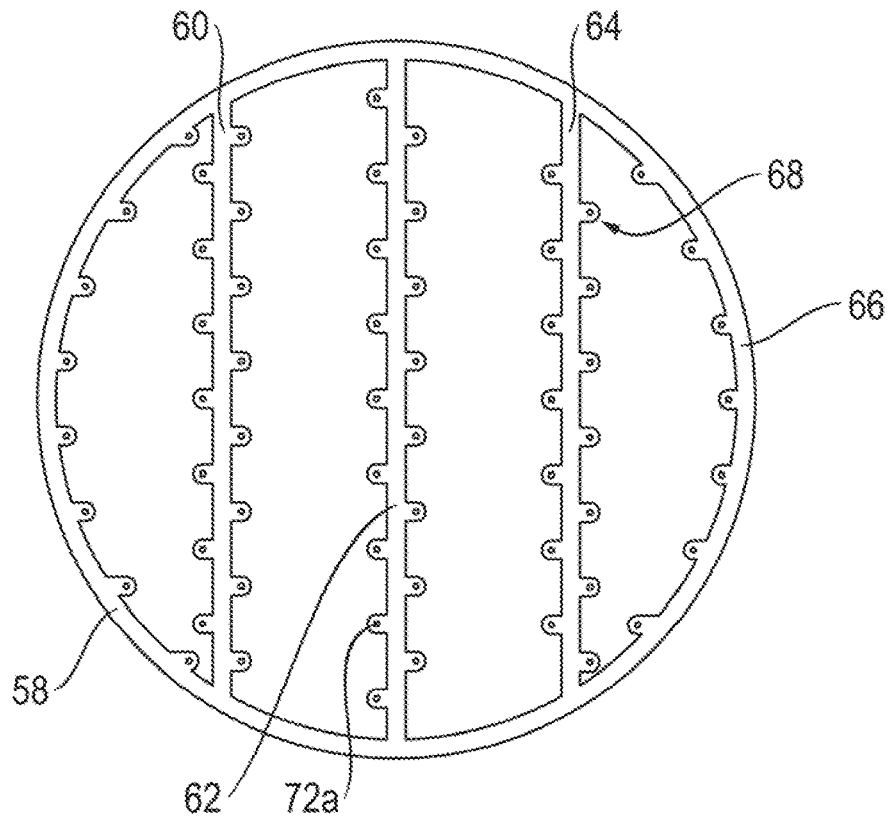
FIG. 8 shows a holding unit with heating-element holding regions that are provided in the form of an integral structure; and, FIG. 9 shows a schematic illustration of an exhaust-gas system with a heating unit upstream of an exhaust-gas treatment unit.

A further alternative configuration of the holding unit 54 is shown in FIGS. 7 and 8. This holding formation 54, too, includes the heating-unit-housing holding region 56, constructed for example with ceramic-fiber material, or else in the form of a molded part for example from ceramic material, which surrounds the heating elements 20, 22, 24, 26 and also the contact elements 36, 38, 40 in a ring-like manner and thereby produces electrical insulation with respect to the heating-unit housing (not illustrated in FIG. 8).

In this configuration, all the heating-element holding regions 58, 60, 62, 64, 66 are provided as an integral, that is, monolithic, structure. In order for it to be possible for the holding projections 72a, 72b illustrated in FIG. 7 and engaging between in each case two heating sections 28 connected to one another by a connecting section 30 to be used in a simple manner in this type of configuration too, a construction with two parts following one another in the exhaust-gas main flow direction A, as is shown in FIGS. 6A and 6B, may be provided in the case of this integral or monolithic structure of the heating-element holding sections 58, 60, 62, 64, 66 too. In each of these two parts, a one-piece or monolithic structure of in each case one part of each of the heating-element holding regions 58, 60, 62, 64, 66 is then provided.

A particular advantage of this integral structure is that recesses for receiving the contact elements 36, 38, 40 may be provided, so that, these too, are held with defined positioning.

As already mentioned, it is advantageously possible for the heating-element holding regions 58, 60, 62, 64, 66 to be constructed with electrically insulating material, such as for example ceramic material or glass ceramic material. Alternatively, there may be provided a metallic base material having an electrically insulating sheathing, which may likewise be constructed with ceramic material, or alternatively may also be in the form of an enamel layer or a glass-ceramic layer. The heating-unit-housing holding region 56 providing electrical insulation with respect to the heating-unit housing 18 may be formed in one piece or multiple pieces as for example a ceramic molded part, or may be provided as fiber material, for example ceramic-fiber material, glass-fiber material, mineral-fiber material or else as a rigid structure composed of glass ceramic.

According to a further particularly advantageous embodiment of the heating unit 14 according to the disclosure, it is possible for one or more of the heating elements 20, 22, 24, 26 to be coated regionally or completely with catalytically active material 78. For this purpose, for example, the electrically conductive construction material may be constructed from a steel alloy having an aluminum content of approximately 5%, for example 1.4767, and onto this metal base material there may be applied, according to application, a TWC coating for the use in connection with gasoline engines or a DOC coating for the use in connection with diesel engines.

The provision of such a catalytically active coating ensures that it is also the case that, owing to the possibly of the coating being directly electrically heated, the temperature at which the catalytic reaction commences is reached very quickly after a cold start, so that the period of time during which exhaust gas expelled from an internal combustion engine is released to the environment without a catalytic reaction can be significantly shortened still further.

It is understood that the foregoing description is that of the preferred embodiments of the invention and that various changes and modifications may be made thereto without departing from the spirit and scope of the invention as defined in the appended claims.

What is claimed is:

1. A heating unit for an exhaust-gas system of an internal combustion engine, the heating unit comprising:
    a heating-unit housing for conducting a flow of exhaust gas in an exhaust-gas main flow direction (A);
    a plurality of heating elements arranged in said heating-unit housing;
    each of said heating elements being shaped in a meandering manner and having a plurality of plate-like heating sections following one another in a heating-element longitudinal direction (H);
    said heating sections of each of said heating elements being connected one to another via respective connecting sections;
    each of said heating elements defining two connection regions arranged at a distance from one another in said heating-element longitudinal direction (H) for electrically conductively connecting each one of said heating elements to at least one of the following:
    i) a connection region of a further heating element; and,
    ii) to a voltage source;
    for each of said heating elements, a heating-conductor length between the connection regions thereof is greater than an extent length of the heating element between the connection regions thereof in said heating-element longitudinal direction (H); and,
    at least two of said heating elements having the same heating-conductor length;
    wherein, for at least one heating element of said at least two heating elements having the same heating-conductor length, a transverse dimension (Q) transverse to said exhaust-gas main flow direction (A) and transverse to said heating-element longitudinal direction (H) varies in the direction of said heating-element longitudinal direction (H).

2. The heating unit of claim 1, wherein all of said heating elements have the same heating-conductor length.

3. The heating unit of claim 1, wherein each of said heating elements is configured of bent flat strip material and has respective broad sides arranged parallel to said exhaust-gas main flow direction (A) and has respective face sides arranged orthogonally to said exhaust-gas main flow direction (A);
    at least two of said heating elements have at least one of the following:
    i) the same constant heating-conductor width between the respective face sides thereof; and,
    ii) the same constant thickness between the respective broad sides thereof.

4. The heating unit of claim 1, wherein
    for at least one of said heating elements, a transverse dimension (Q) is constant in said direction of said heating-element longitudinal direction (H).

5. The heating unit of claim 4, wherein, for at least one of said heating elements having a constant transverse dimension (Q), the transverse dimension (Q) is less than a maximum transverse dimension of the at least one heating element having a transverse dimension (Q) varying in said heating-element longitudinal direction (H).

6. The heating unit of claim 1, further comprising:
    contact elements;
    said heating elements being electrically conductively connected in the connection regions corresponding thereto to said contact elements; and,
    at least two of said heating elements being electrically conductively connected in one of the connection regions corresponding thereto to one of said contact elements and being electrically conductively connected in the other connection region corresponding thereto to another one of said contact elements.

7. The heating unit of claim 6, wherein:
    a first group ($G_1$) has at least two of said heating elements electrically conductively connected in one connection region thereof to a first one of said contact elements and are electrically conductively connected in the other connection region thereof to a second one of said contact elements; and,
    a second group ($G_2$) has at least two of further ones of said heating elements electrically conductively connected in one connection region thereof to a third one of said contact elements and are electrically conductively connected in the other connection region thereof to the second one of said contact elements.

8. The heating unit of claim 7, wherein the number of heating elements of said first group ($G_1$) is equal to the number of heating elements of said second group ($G_2$).

9. The heating unit of claim 1, wherein at least one of the following applies:
    i) for all of said heating elements, said heating sections, which directly follow one another in said heating-element longitudinal direction (H) are at the same, constant distance from one another in said heating-element longitudinal direction (H); and, ii) for all of said heating elements, heating sections, which directly follow one another in said heating-element longitudinal direction (H) are arranged parallel to one another.

10. The heating unit of claim 1, wherein, for all of said heating elements, an exhaust-gas contact surface is provided at least regionally with catalytically active material.

11. The heating unit of claim 1, further comprising at least one of the following:
   i) a holding unit for holding said heating elements on said heating-unit housing in an electrically insulated manner; and,
   ii) a holding unit for holding said heating elements, which are directly neighbors, transverse to said heating-element longitudinal direction (H) in an electrically insulated manner with respect to one another.

12. The heating unit of claim 11, wherein at least one of the following applies:
   i) said holding unit includes a heating-unit-housing holding region which surrounds all said heating elements in a ring-like manner; and,
   ii) said holding unit includes, in assignment to at least one heating element, a heating-element holding region.

13. The heating unit as claimed in claim 12, wherein said holding unit includes a plurality of heating-element holding regions, at least some heating-element holding regions of the plurality of heating-element holding regions being formed in one piece with one another.

14. The heating unit of claim 12, wherein said heating-element holding region includes two parts arranged so as to follow one another in said exhaust-gas main flow direction (A) and which are formed separately from one another.

15. The heating unit of claim 12, wherein each said heating-element holding region has, in assignment to each heating element held thereby, a form-fit holding formation for holding against movement in said heating-element longitudinal direction (H) each said connecting section of the at least one heating element held thereby.

16. The heating unit of claim 15, wherein at least one of the following applies:
   i) each said form-fit holding formation includes a plurality of holding projections which engage between corresponding mutually adjacent connecting sections which are directly neighbors in said heating-element longitudinal direction (H); and,
   ii) each said form-fit holding formation includes a plurality of holding projections which engage between corresponding mutually adjacent heating sections which are connected to one another by corresponding ones of said connecting section.

17. The heating unit of claim 12, wherein at least one of the following applies:
   i) said holding unit is configured of insulating material; and,
   ii) said holding unit is coated with electrically insulating material.

18. The heating unit of claim 12, wherein at least one of the following applies:
   i) said holding unit is configured of insulating material at least in regions thereof which are in contact with said heating elements; and,
   ii) said holding unit is coated with electrically insulating material at least in regions thereof which are in contact with said heating elements.

19. The heating unit of claim 1, wherein at least one of the following applies:
   i) all of said heating elements are arranged adjacently transverse to said exhaust-gas main flow direction (A); and,
   ii) all of said heating elements are arranged parallel to one another in said heating-element longitudinal direction (H); and,
   iii) for each said heating element, all of the heating sections thereof are arranged orthogonally to said heating-element longitudinal direction (H).

20. An exhaust-gas system for an internal combustion engine, the exhaust-gas system comprising:
   an exhaust-gas treatment unit including at least one of a catalytic converter and a particle filter; and,
   a heating unit arranged upstream of an exhaust-gas treatment unit;
   the heating unit including:
   a heating-unit housing for conducting a flow of exhaust gas in an exhaust-gas main flow direction (A);
   a plurality of heating elements arranged in said heating-unit housing;
   each of said heating elements being shaped in a meandering manner and having a plurality of plate-like heating sections following one another in a heating-element longitudinal direction (H);
   said heating sections of each of said heating elements being connected one to another via respective connecting sections;
   each of said heating elements defining two connection regions arranged at a distance from one another in said heating-element longitudinal direction (H) for electrically conductively connecting each one of said heating elements to at least one of the following:
   i) a connection region of a further heating element; and,
   ii) to a voltage source;
   for each of said heating elements, a heating-conductor length between the connection regions thereof is greater than an extent length of the heating element between the connection regions thereof in said heating-element longitudinal direction (H); and,
   at least two of said heating elements having the same heating-conductor length;
   wherein, for at least one heating element of said at least two heating elements having the same heating-conductor length, a transverse dimension (Q) transverse to said exhaust-gas main flow direction (A) and transverse to said heating-element longitudinal direction (H) varies in the direction of said heating-element longitudinal direction (H).

21. A heating unit for an exhaust-gas system of an internal combustion engine, the heating unit comprising:
   a heating-unit housing for conducting a flow of exhaust gas in an exhaust-gas main flow direction (A);
   a plurality of heating elements arranged in said heating-unit housing; each of said heating elements being shaped in a meandering manner and having a plurality of plate-like heating sections following one another in a heating-element longitudinal direction (H);
   said heating sections of each of said heating elements being connected one to another via respective connecting sections;
   each of said heating elements defining two connection regions arranged at a distance from one another in said heating-element longitudinal direction (H) for electrically conductively connecting each one of said heating elements to at least one of the following:

i) a connection region of a further heating element; and,
ii) to a voltage source;
for each of said heating elements, a heating-conductor length between the connection regions thereof is greater than an extent length of the heating element between the connection regions thereof in said heating-element longitudinal direction (H);
at least two of said heating elements having the same heating-conductor length;
contact elements, said heating elements being electrically conductively connected in the connection regions corresponding thereto to said contact elements, at least two of said heating elements being electrically conductively connected in one of the connection regions corresponding thereto to one of said contact elements and being electrically conductively connected in the other connection region corresponding thereto to another one of said contact elements; and
wherein:
a first group (G1) has at least two of said heating elements electrically conductively connected in one connection region thereof to a first one of said contact elements and are electrically conductively connected in the other connection region thereof to a second one of said contact elements; and,
a second group (G2) has at least two of further ones of said heating elements electrically conductively connected in one connection region thereof to a third one of said contact elements and are electrically conductively connected in the other connection region thereof to the second one of said contact elements.

22. An exhaust-gas system for an internal combustion engine, the exhaust-gas system comprising:
an exhaust-gas treatment unit including at least one of a catalytic converter and a particle filter; and,
a heating unit arranged upstream of an exhaust-gas treatment unit; the heating unit including:
a heating-unit housing for conducting a flow of exhaust gas in an exhaust-gas main flow direction (A);
a plurality of heating elements arranged in said heating-unit housing; each of said heating elements being shaped in a meandering manner and having a plurality of plate-like heating sections following one another in a heating-element longitudinal direction (H);
said heating sections of each of said heating elements being connected one to another via respective connecting sections;
each of said heating elements defining two connection regions arranged at a distance from one another in said heating-element longitudinal direction (H) for electrically conductively connecting each one of said heating elements to at least one of the following:
i) a connection region of a further heating element; and,
ii) to a voltage source;
for each of said heating elements, a heating-conductor length between the connection regions thereof is greater than an extent length of the heating element between the connection regions thereof in said heating-element longitudinal direction (H);
at least two of said heating elements having the same heating-conductor length;
contact elements, said heating elements being electrically conductively connected in the connection regions corresponding thereto to said contact elements, at least two of said heating elements being electrically conductively connected in one of the connection regions corresponding thereto to one of said contact elements and being electrically conductively connected in the other connection region corresponding thereto to another one of said contact elements; and
wherein:
a first group (G1) has at least two of said heating elements electrically conductively connected in one connection region thereof to a first one of said contact elements and are electrically conductively connected in the other connection region thereof to a second one of said contact elements; and,
a second group (G2) has at least two of further ones of said heating elements electrically conductively connected in one connection region thereof to a third one of said contact elements and are electrically conductively connected in the other connection region thereof to the second one of said contact elements.

\* \* \* \* \*